United States Patent [19]

Kadan et al.

[11] Patent Number: 4,722,851

[45] Date of Patent: Feb. 2, 1988

[54] FLAN-TYPE PUDDING USING CEREAL FLOUR

[75] Inventors: Ranjit S. Kadan, New Orleans; George M. Ziegler, Jr., Harahan, both of La.

[73] Assignee: The United States of America as represented by the Secretary of Agriculture, Washington, D.C.

[21] Appl. No.: 916,346

[22] Filed: Oct. 7, 1986

[51] Int. Cl.⁴ .............................................. A23L 1/187
[52] U.S. Cl. ..................................... 426/579; 426/573
[58] Field of Search ............... 426/573, 575, 577, 578, 426/579

[56] References Cited

U.S. PATENT DOCUMENTS

| | | | |
|---|---|---|---|
| 1,266,201 | 5/1918 | Boddington | 426/573 |
| 3,031,308 | 4/1962 | Campbell | 426/575 |
| 3,409,443 | 11/1968 | Polya et al. | 426/575 |
| 3,619,208 | 11/1971 | Bahoshy et al. | 426/575 |
| 4,623,552 | 11/1986 | Rapp | 426/575 |

FOREIGN PATENT DOCUMENTS

395359½ 5/1943 Belgium .............................. 426/565

*Primary Examiner*—Jeanette Hunter
*Attorney, Agent, or Firm*—M. Howard Silverstein; David G. McConnell; Raymond C. Von Bodungen

[57] ABSTRACT

A new flan-type pudding using cereal flour to improve human nutrition is disclosed. The flan comprises the following combination of ingredients: Non Fat Dry Milk of from about 10 to 30 g; Sucrose of from about 10 to 20 g; Carrageanan of from about 0.2 to 1.0 g; Locust Bean gum of from about 0.07 to 0.3 g; Pectin of from about 0.05 to 0.3 g; Tetra Potassium Pyrophosphate of from about 0.1 to 1.0 g; and, Rice Flour of from about 0.5 to 8.0 g.

11 Claims, No Drawings

FLAN-TYPE PUDDING USING CEREAL FLOUR

BACKGROUND OF THE INVENTION (1) Field of the Invention

This invention relates to a flan-type puddings.

(2) Description of the Prior Art

Dairy products, particularly milk, have played an important role in human nutrition for centuries. These products have also been the major source of calcium in people of Caucasian background. Of recent date the consumption of dairy products has decreased in persons of middle and elderly age groups which also represents the fastest growing segment of population in developed countries.

Several socioeconomic reasons are responsible for this reduction. Serious health problems exist with this group which is more susceptible to both osteoporosis and hypertension which can result from a deficiency of calcium. Consequently, there exists a critical need for a convenient appealing novel diary food which fits the life style of this rapid growing segment of population.

Flan or custard type dairy desserts (milk pudding) have traditionally been an attractive food for this target population. Old fashion type flan is a moldable fresh dairy product utilizing eggs as a gelling agent. However, modern food technology has developed several ingredients, e.g. carrageenan, gelatin, gums and other stabilizing agents which can replace eggs (hence cholesterol free) for its gelling property. Several examples of such usage are available, but all use milk, sugar, carrageenan (or other stabilizing agent) and sometimes small amounts of pregelatinized or modified starch because ungelatinized starch is known to retard the formation of the characteristic smooth egg flan-like gel obtained by these gelling agents. One such typical composition and process for making milk puddings would be found in U.S. Pat. No. 2,808,337.

U.S. Pat. No. 3,250,621 describes frozen glues using an extract of Euchema seaweed as gelling agent, and U.S. Pat. No. 3,443,968 discloses flan-type milk pudding with minimal syneresis, by adding to heated milk carrageenan and phosphates in amounts sufficient to decrease the influence of calcium content of the milk on the carrageenan.

U.S. Pat. No. 3,367,783 teaches that a variety of gel formulations can be improved by using a mixture of locust bean gum and calcium carrageenan for gel formulation.

None of the prior art teaches the use of native or untreated cereal flour for use in egg flan-like food processing or composition of flan-type puddings primarily because it was believed that certain properties in cereal flour would interfere with the gelling mechanism of carrageenan and other stabilizers.

SUMMARY OF THE INVENTION

A new flan-type pudding using cereal flour to improve human nutrition is disclosed and comprises the following combination of ingredients: Non Fat Dry Milk of from about 10 to 30 g; Sucrose of from about 10 to 20 g; Carrageenan of from about 0.2 to 1.0 g; Locust Bean gum of from about 0.07 to 0.3 g; Pectin of from about 0.05 to 0.3 g; Tetra Potassium Pyrophosphate of from about 0.1 to 1.0 g; and, Rice Flour of from about 0.5 to 8.0 g, is disclosed.

The minor components of rice flour such as proteins, lipids and fiber, etc. in combination with non fat dry milk, carrageenan and other additives of the preferred embodiments contribute an important role in imparting a very desirable flan-like texture to the instant invention. Furthermore, it is the rice flour which adds the nutritional enrichment addition to the flan. This invention represents an important advance in the food industry in view of the fact that previously it was thought that the presence of starch and other components of cereal flour, such as rice flour, would retard the gelling properties of carrageenan which is a necessary gelling ingredient for making flan-type puddings which do not utilize eggs and whole milk.

DESCRIPTION OF THE PREFERRED EMBODIMENTS

This invention relates to a new flan-type of pudding which utilizes untreated cereal flour, more specifically rice flour, as an important nutritional enrichment addition to flan. Dehulled rice, for example, brown rice consists typically of 77% carbohydrate, about 7.5% protein, 2% lipids, 1% fiber (complex carbohydrate), 1.2% ash and 12% moisture. Brown rice is normally further milled or polished to obtain so called white or polished rice. During the milling the lipids, ash and fiber contents are reduced to about 0.5%, however, the protein content is affected (reduced) only slightly. Both brown rice and white rice flours are disclosed in this invention as possessing satisfactory properties for making flan.

Chemically, starch is a carbohydrate and the basic monomeric unit is D-anhydroglucose, and when starch is hydrolyzed with dilute acids it will yield D-glucose. The predominant linkage is the 1,4-alpha glucosidic bond. Two basic types of polymers are present in most starches, amylose and amylopectin. Both are polymers made up of anhydroglucose units. Amylose is a linear polymer in which essentially all of the anhydroglucose units are linked through 1,4-alpha-glucosidic bonds. It may contain anywhere from about 200 to 2000 anhydroglucose units. Amylopectin, the other polymer in starch, has a highly branched structure. Each branch contains about 15–25 anhydrous units interconnected by linkages attaching carbon 1 of the anhydroglucose unit at the start of the branch to carbon 6. Amylose and amylopectin contents of a starch are known to have different functional properties and hence its food applications. Various food starches have varying amounts of amylose/amylopectin contents. For example, long grain rice flour have about 22–24% amylose with the balance being amylopectin.

Food starches are produced commercially by extraction from the seeds of plants such as corn, wheat, sorghum, and rice or roots such as potato and tapioca. The character of starch will vary with the plant source from which it was derived. It can also vary as a result of processing (purification) when extracted from the plant. Most commercial starches are relatively pure, that is, nonstarch components of seed such as lipids, proteins and fiber, etc. are removed during processing and are gelatinized (cooked) or ungelatinized. Gelatinized starches require little or no cooking and are used in ready to use foods.

Modified starches are either chemically treated or in some cases produced by genetic manipulation of parent seed plants. In this way specified properties are designed into processed food. Obviously, the cost of such food products obtained from modified and gelatinized starches rises considerably as to naturally occurring cereal flour.

Carrageenan is a high molecular weight linear polysaccharide obtained from sea weeds and made up of repeating galactose units linked with alternating alpha 1-3, and beta 1-4 glycosidic linkages. In addition, the galactose units in this general structure often occur as 3,6-anhydro-D-glactose and sulphate esters may also be present on some glactose units. The many sea weed plants approved as sources for extracts which are used in food applications contain various amounts of three types of carrageenan known as kappa, iota and lambda. [The primary differences which influence the properties of carrageenan are numbers and position of the ester sulfate groups on the repeating galactose units.]

Locust bean gum is the refined endosperm of the seed of the carob tree (*cerotonia siliqua*). Structurally, locust bean is a neutral galactomannan polymer consisting of a main chain of D-mannose units with a side chain of D-glactose on every fourth or fifth unit.

Pectin is a carbohydrate type polymer commonly used in the food, cosmetic and pharmaceutical industry. It is comprised of chains of galacturonic acid units joined by (1-4) glycosidic linkages.

For purposes of this invention rice flour was obtained by grinding polished rice (broken rice from milling) to about 100 mesh size. Whole brown or white rice was also used by grinding to 100 mesh size. These flours were then evaluated by combining with other ingredients necessary to make flan.

EXAMPLE 1

Flan from Non Fat Dry Milk and White Rice Flour

To a beaker, was added the following:
12.6 g Non Fat Dry Milk
14.0 g Sucrose (sugar)
0.49 g Carrageenan (FL 674 P)
[A mixture of various carrageenans obtained from Marrine Colloids]
0.16 g Locust Bean Gum
0.112 g Pectin
0.364 g Tetra Potassium Pyrophosphate
3.44 g Rice Flour (Long Grain)
144 g Water The mixture was stirred to a homogeneous slurry [Note: (1) all components will not suspend (dissolve) homogeneously at room temperature; (2) the final texture was found to be affected by the total hydration time before heating] and held for 10 minutes. The beaker containing the mixture was transferred into a boiling water bath. The contents were stirred, while heating till it reached 88° C. It was held in boiling water bath for additional two minutes, while stirring. Then the contents were transferred into a mold and stored at refrigeration temperatures overnight. Next day the finished food product was evaluated by a FMC gel tester and also organoleptically (tasting) for texture and other desirable attributes. The results are shown in Table I.

A very desirable texture, similar to flan made from sweetened milk and beaten eggs was obtained. It had good chewiness, good demolding properties and can be sliced and eaten with a spoon and resembled creamy pudding or desert. Commonly used food colors, and flavors such as citrus (orange), vanilla and butter scotch were added without any problems. This example shows that flans were produced using naturally occurring rice flour and non fat dry milk which are as good as older known recipies using eggs and whole milk.

EXAMPLE 2

Flan Utilizing Specially Prepared Starches

All the ingredients were the same as in Example 1, except 0.364 g of Tetra Sodium Pyrophosphate was substituted for Tetro Potassium Pyrophosphate.

The product was very soft, and had poor demolding properties. The textures of demolded samples literally collapsed within 15-30 minutes into a mushy food. This example shows that acceptable flans cannot be produced using a commonly recommended ingredient such as tetra sodium pyrophosphate in combination with rice flour.

EXAMPLE 3

All the ingredients were the same as in Example 1, except 3.44 g of modified starch (H-50) from National Starch and Chemical Co., P. O. Box 6500, Bridgewater, N.J. 08807 was substituted for long grain rice flour.

The sample had satisfactory texture but collapsed within a few minutes of demolding. This example showed that the rice flour was necessary and could not be substituted by specialized starch.

EXAMPLE 4

All the ingredients were the same as in Example 1, except 3.44 g of modified starch (Thermtex) from National Starch and Chemical Co., P. O. Box 6500, Bridgewater, N.J., 08807 was substituted for long grain rice flour.

The sample had soft, undesirable texture which collapsed within few minutes of demolding. This example shows the same as Example 3.

EXAMPLE 5

All the ingredients, were the same as in Example 1, except 3.44 g of brown rice flour made from long grain rice was substituted for rice flour.

The texture was comparable to that of Example 1 which was very desirable. The product had brownish color and typical flavor of brown rice. Commonly used food flavors and colors were found compatible.

EXAMPLE 6

All the ingredients were the same as in Example 1, except 14 g of fructose was substituted for sucrose.

The texture improved significantly over that of Example 1 as far as demolding, slicing and spoonability properties were concerned. The taste was considerably sweeter (as expected) than Example 1 but resulted in a very desirable flan.

EXAMPLE 7

All the ingredients were the same as in Example 1, except 14 g of dextrose was substituted for sucrose.

The texture was comparable to the results of Example 5 and (as expected) less sweet than both Examples 1 and 5. However, a very desirable flan resulted.

EXAMPLE 8

All the ingredients were the same as in Example 1, except 33.3 g of Iso Sweet 100, (Fructose syrup) containing 42% fructose (remaining about 16% dextrose, 3% complex carbohydrate, and 3% water) obtained from A. E. Staley Manufacturing Co., P. O. Box 151, Decator, Ill. 62525, was substituted for sucrose. The amount of water in Iso Sweet 100 was taken into account so that final product had equal solids to liquid ratio as was in Example 1.

The texture was similar to that of Example 1, however it was found to be smoother and (as expected) sweeter than that of Example 1.

EXAMPLE 9

All the ingredients were the same as in Example 8 except 25.5 g of Iso Sweet 5500, containing 55% fructose, 9% dextrose, 3% complex carbohydrate and 33% water (A. E. Staley Manufacturing Co.) was substituted for Iso Sweet 100.

The texture was similar to that of Example 1, however it was found to be smoother and (as expected) sweeter than that of Example 1.

EXAMPLE 10

All the ingredients were the same as in Example 1, except 140 ml of whole (regular) milk was substituted for non fat dry milk and water.

The demolding, slicing and spoonlike characteristics improved over that of Example 1. The product had creamy, soft and desirable mouth feel. Commonly used food flavors and colors were compatible. The result was a desirable flan.

EXAMPLE 11

All the ingredients were the same as in Example 1, except 17.75 g of specially prepared mixture containing 71% NFDM, 27.6% milk fat and 1.5% Durlac 100 (Emulsifier, obtained from Durkee Foods, 900 Union Commerce Bld. Cleveland, Ohio 44115) was substituted for NFDM. The mixture was prepared by suspending appropriate quantities of the mixture in water (13% solids). Durlac 100 and milk fat was heated to melt before addition to the water. The mixture was homogenized in a Gaulin Laboratory (Type 15 M 8 TA, single piston, two stage) homogenizer at 800 lb (1st stage) and 3000 lb (2nd stage) pressure and freeze dried to about 4% moisture.

The demolding, slicing and spoonlike characteristics improved over the results of Example 1. The product had creamy, soft and desirable mouth feel. Commonly used food flavors and colors were compatible.

EXAMPLE 12

All the ingredients were the same as in Example 11, except 27.6% Crisco (hydrogenated vegetable oil obtained from Proctor and Gamble, Cincinnati, Ohio, 45202) was substituted for milk fat.

The demolding, slicing and spoonlike characteristics improved that of Example 1. The product had creamy, soft and desirable mouth feel. Commonly used food flavors and colors were compatible.

EXAMPLE 13

All the ingredients were the same as in Example 11, except peanut oil was substituted for milk fat.

The demolding, slicing and spoonlike characteristics improved significantly over that of Example 1. The product had creamy, soft and desirable mouth feel. Commonly used food flavors and colors were compatible.

TABLE I

Texture and Organoleptic Properties of Flan-Like Experimental Foods

| Ex. 1 | FMG GEL TEXTURE Force (grams) Needed to Break the Gel | Plunger Depth at (cms) the Break Point | Organoleptic Characterization |
|---|---|---|---|
| 1 | 93 | 0.74 | Desirable flan-like texture |
| 2 | 30 | 0.80 | Very soft, mushy undesirable texture |
| 3 | 57 } no clear | 0.70 | Very soft, mushy undesirable texture |
| 4 | 54 } break pt | 0.76 | Very soft, mushy undesirable texture |
| 5 | 90 | 0.80 | Good desirable flan-like texture |
| 6 | 95 | 0.94 | Excellent desirable flan-like texture |
| 7 | 121 | 1.10 | Excellent desirable flan-like texture |
| 8 | 116 | 0.67 | Excellent desirable flan-like texture |
| 9 | 91 | 0.80 | Excellent desirable flan-like texture |
| 10 | 121 | 1.14 | Excellent desirable flan-like texture |
| 11 | 116 | 1.45 | Excellent desirable flan-like texture |
| 12 | 148 | 1.41 | Excellent desirable flan-like texture |
| 13 | 142 | 1.87 | Excellent flan-like texture |

FMC Gel Tester is a specially designed instrument to measure stress/strain curves (and hence the break force of a wide variety of gels). This is accomplished by lowering a plunger (simulated knife at the end) into the gel at a constant rate (accomplished by a synchronous motor). The assembly enables to record both the force required to rupture (break) the gel and indirectly (converted from time into the distance) the distance. A high force indicates firm gel.

A regular flan, made from whole milk, egg and sugar was found to have about 120 to 150 g (force needed to break the gel) and 1.1-1.3 cm depth.

It should be noted that several other oil seeds, such as partially defatted peanut and almonds and regular peanut/almonds also gave very desirable texture, if these products were blended and homogenized as in Example No. 11. The finished product naturally had typical flavor characteristics of starting oil seeds.

Also several frozen fruits, like peaches, strawberries and blue berries could also be added without sacrificing the texture.

TABLE II

| POSSIBLE INGREDIENTS FOR FLAN | | |
|---|---|---|
| Ingredients | Allowable Range–(g) | Preferred Range–(g) |
| Non Fat Dry Milk (NFDM) | 10–30 | 12.0–14.0 |
| Sucrose | 10–20 | 12.0–16.0 |
| Fructose | 10–20 | 12.0–16.0 |
| Dextrose | 10–20 | 12.0–16.0 |

TABLE II-continued
POSSIBLE INGREDIENTS FOR FLAN

| Ingredients | Allowable Range–(g) | Preferred Range–(g) |
| --- | --- | --- |
| Iso Sweet 100 (42% Fructose) | 23–46 | 25.0–35.0 |
| Iso Sweet 5500 (55% Fructose) | 18–35 | 22.0–30.0 |
| Carrageenan (FL 674P) | 0.20–1.0 | 0.40–0.60 |
| Locust Bean Gum | 0.07–0.03 | 0.12–0.20 |
| Pectin | 0.05–0.3 | 0.10–0.15 |
| Salt (NaCl) | To Taste | To Taste |
| Tetro Potassium Phosphate | 0.1–1.9 | 0.20–0.50 |
| Rice Flour (Whole Brown) | 0.5–8.0 | 2.0–5.0 |
| Rice Flour (Brown, White or Brown) | 0.5–8.0 | 2.0–5.0 |
| Rice Flour (Whole Polished White) | 0.5–8.0 | 2.0–5.0 |
| Water | 120–160 | 120–160 |
| Vegetable Oil | 1.0–12.0 | 4–8 |
| Peanut Oil | 1.0–12.0 | 4–8 |
| Homogenated Oil | 1.0–12.0 | 4–8 |
| Milk Fat | 1.0–12.0 | 4–8 |
| Whole Milk (instead of water & NFDM) | 120–160 | 120–160 |

We claim:

1. An egg-free flan-type pudding comprising the following composition of ingredients: Non Fat Dry Milk of from about 10 to 30 g; Sucrose of from about 10 to 20 g; Carrageenan of from about 0.2 to 1.0 g; Locust Bean gum of from about 0.07 to 0.3 g; Pectin of from about 0.05 to 0.3 g; Tetra Potassium Pyrophosphate of from about 0.1 to 1.0 g; and untreated Rice Flour of from about 0.5 to 8.0 g.

2. The flan of claim 1 wherein the composition comprises the following combination of ingredients: Non-fat dry milk of from about 12.0 to 14.0 g; Sucrose of from about 12.0 to 16.0 g; Carrageenan of from about 0.40 to 0.6 g; Locust Bean Gum of from about 0.12 to 0.2 g; Pectin of from about 0.10 to 0.15 g; Tetra Potassium Pyrophosphate 0.20 to 0.50 g; and, untreated Rice Flour of from about 2.0 to 5.0 g.

3. The flan of claim 1 including of from about 120–160 g water.

4. The flan of claim 1 wherein the rice flour is selected from the group consisting of brown, polished white, broken and whole rice.

5. The flan of claim 1 including of from about 0.5 to 10 g of oil selected from the group consisting of peanut, vegetable, animal and homogenated oils.

6. The flan of claim 2 including of from about 120–160 g water.

7. In an egg-free flan-type pudding of the type comprising milk and carrageenan as a substitute gelling and stabilizing agent for eggs, the improvement wherein the pudding further contains from 2 to 13% untreated rice flour, wherein said flour essentially is the only starch-containing substance in said pudding, and further wherein said pudding includes tetra potassium pyrophosphate.

8. An instant flan-type pudding as described in claim 7 wherein said milk is nonfat dry milk in amounts of from 47 to 50% of the dry weight of the pudding.

9. An instant flan-type pudding as described in claim 8 which further comprises locust bean gum in amounts of from 0.3 to 0.5% of the dry weight of the pudding.

10. An instant flan-type pudding as described in claim 9 which further comprises pectin in amounts of from 0.2 to 0.5% of the dry weight of the pudding.

11. An instant flan-type pudding as described in claim 8 which further comprises vegetable or animal oils in amounts of from 2 to 14% of the dry weight of the pudding.

* * * * *